(12) United States Patent
Riedel et al.

(10) Patent No.: US 12,085,498 B2
(45) Date of Patent: Sep. 10, 2024

(54) CORROSION TESTING DEVICE

(71) Applicant: KÖHLER AUTOMOBILTECHNIK GmbH, Lippstadt (DE)

(72) Inventors: Jürgen Riedel, Berlin (DE); Fabian Muller, Geseke (DE)

(73) Assignee: Köhler Automobiltechnik GmbH, Lippstadt (DE)

( * ) Notice: Subject to any disclaimer, the term of this patent is extended or adjusted under 35 U.S.C. 154(b) by 245 days.

(21) Appl. No.: 17/802,432

(22) PCT Filed: Feb. 22, 2021

(86) PCT No.: PCT/EP2021/054335
§ 371 (c)(1),
(2) Date: Aug. 25, 2022

(87) PCT Pub. No.: WO2021/170539
PCT Pub. Date: Sep. 2, 2021

(65) Prior Publication Data
US 2023/0184665 A1 Jun. 15, 2023

(30) Foreign Application Priority Data
Feb. 26, 2020 (DE) .......................... 202020101042.5

(51) Int. Cl.
*G01N 17/00* (2006.01)
(52) U.S. Cl.
CPC ................................. *G01N 17/002* (2013.01)

(58) Field of Classification Search
CPC .... G01N 17/002; G01N 17/006; G01N 17/02; G01N 17/04; G01N 17/043; G01N 17/00;
(Continued)

(56) References Cited

U.S. PATENT DOCUMENTS

| 2,937,524 A | 5/1960 | Gregor |
| 2,976,123 A * | 3/1961 | Marsh .................... G01N 17/00 422/53 |

(Continued)

FOREIGN PATENT DOCUMENTS

| DE | 102008046472 A1 | 3/2010 |
| DE | 102018105766 A1 | 9/2018 |
| WO | 2011/153558 A1 | 12/2011 |

OTHER PUBLICATIONS

Sensiron The Sensor Company, Schutzabdeckung fur SHT3x-Feuchtesensoren, Apr. 19, 2016.
(Continued)

*Primary Examiner* — Suman K Nath
(74) *Attorney, Agent, or Firm* — Richard M. Goldberg

(57) ABSTRACT

A corrosion testing device includes a test chamber (10), a climate conditioning system (12) for maintaining a controlled atmosphere in the test chamber (10), and a measurement system including a feeler (16) having a measurement element (24) arranged on a printed circuit board (22) for measuring the moisture content of the atmosphere, in which the printed circuit board (22) is detachably held on a feeler base (18) via plug connectors (28) and is, with the possible exception of certain contact or measurement surfaces, fully encapsulated in an anti-corrosion coating.

12 Claims, 2 Drawing Sheets

(58) Field of Classification Search
CPC .... G01N 27/223; G01N 27/22; G01N 27/227; G01N 29/04; G01N 2203/024
See application file for complete search history.

(56) References Cited

U.S. PATENT DOCUMENTS

| | | |
|---|---|---|
| 2003/0214310 A1 | 11/2003 | McIntosh |
| 2009/0142227 A1 | 6/2009 | Fuchs et al. |
| 2013/0037420 A1* | 2/2013 | Funahashi .............. G01N 17/04 205/775.5 |
| 2016/0363525 A1* | 12/2016 | Friedersdorf ........ G01N 27/023 |

OTHER PUBLICATIONS

Sensiron The Sensor Company, Sensirion Evaluationskit fur Umweltsensoren, Dec. 1, 2018.

* cited by examiner

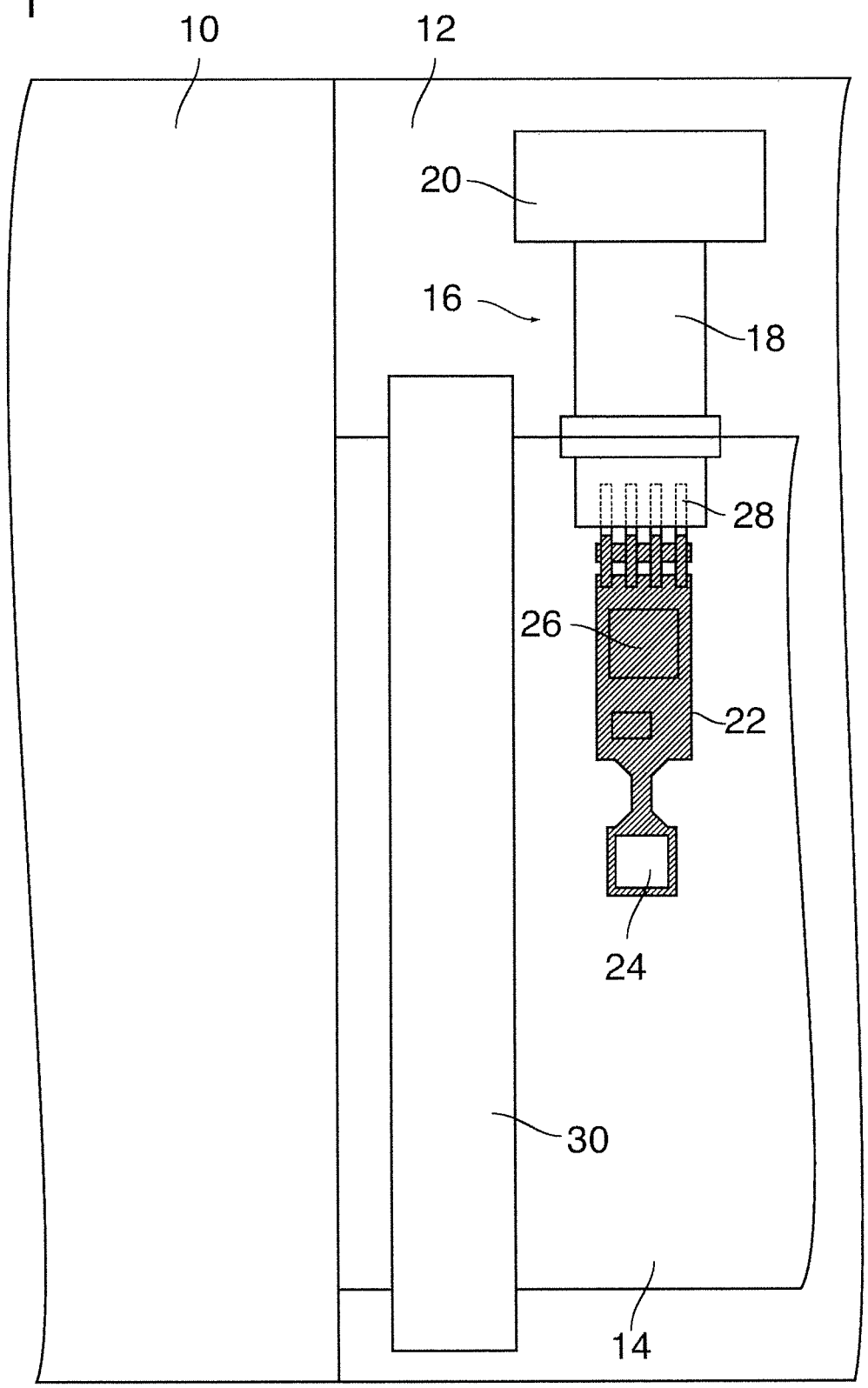

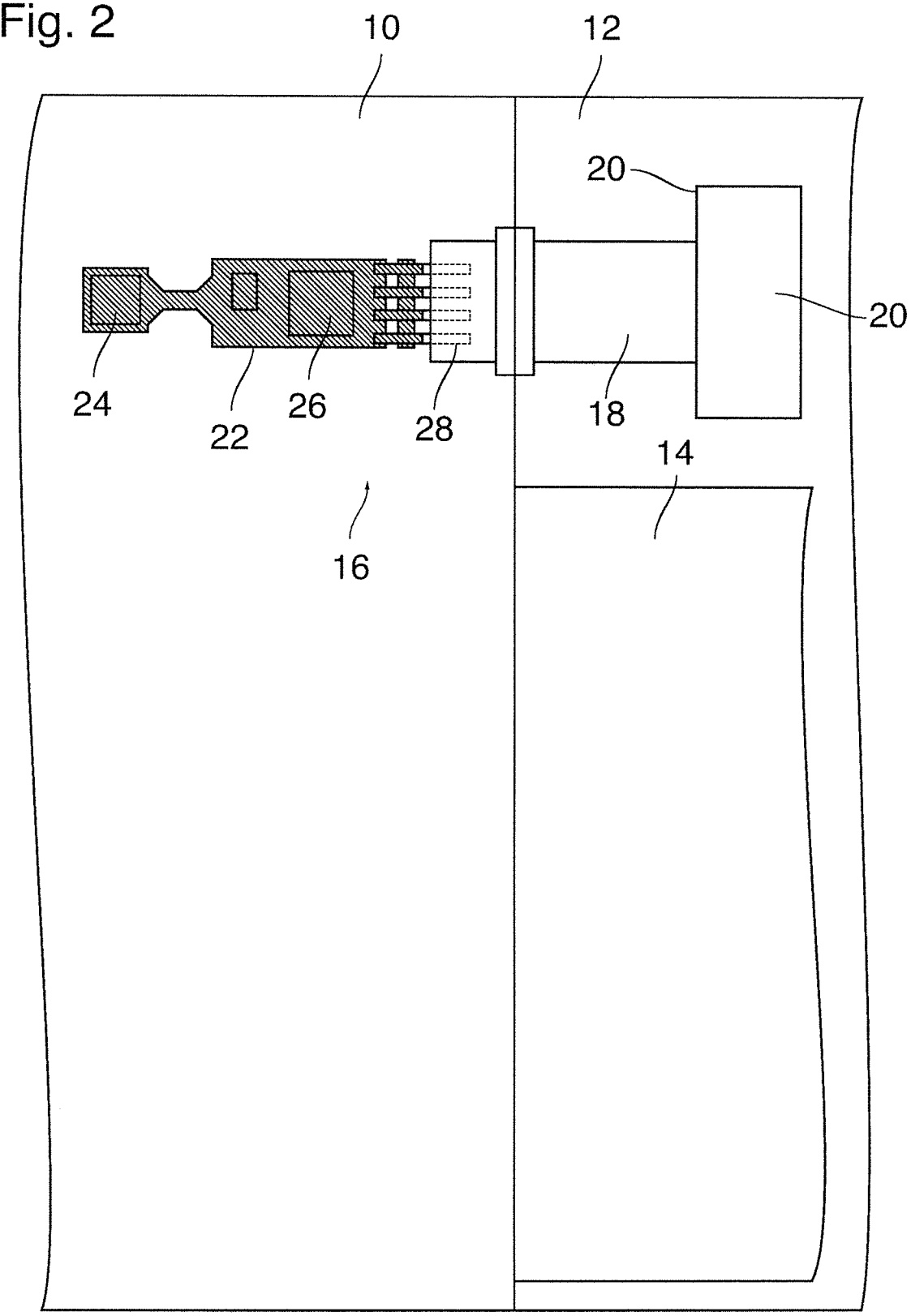

CORROSION TESTING DEVICE

BACKGROUND OF THE INVENTION

The invention relates to a corrosion testing device having a test chamber, a climate conditioning system for maintaining a controlled atmosphere in the test chamber, and a measurement system which has a feeler having a measurement element arranged on a printed circuit board for measuring a moisture content of the atmosphere.

Such corrosion testing devices are provided for testing the corrosion resistance of machine components or other objects by exposing the objects to be tested to a corrosive atmosphere for a specified period of time in the test chamber. Maintaining the controlled atmosphere requires in particular a permanent and exact monitoring and correction, as the case may be, of the moisture content of the atmosphere.

In the known corrosion testing devices, the feeler has only a limited lifetime because it is generally exposed to the same corrosive conditions as the objects to be tested.

SUMMARY OF THE INVENTION

It is an object of the invention to provide a corrosion testing device that causes less costs for maintenance and repair.

According to the invention, in order to achieve this object, the printed circuit board is held detachably on a feeler base via a plug connector and, with the possible exception of certain contacting surfaces or measuring surfaces, it is fully encapsulated in an anti-corrosion coating.

Since the printed circuit board having this measurement element, is detachable from the feeler base, the printed circuit board, without the feeler base, can be immersed into a coating bath and can thereby be provided with the anti-corrosion coating which will then inhibit corrosion of the printed circuit board and the electronic components connected thereto. Only the contacts of the plug connectors remain outside of the coating bath or are covered during the coating process, so that the contact surfaces remain uncoated. Depending upon the measurement principle, it may also be necessary to exclude certain measurement surfaces of the measurement element, such as electrodes of a capacitive measurement element, from the coating.

Another useful effect of the plug-in feature of the printed circuit board is that, if corrosion does eventually have caused damage to the measurement system, it is sufficient to replace the feeler rather than having to replace the entire circuit board. All in all, considerable cost savings can be achieved in this way.

Useful details of the invention have been indicated in the dependent claims.

Suitable coating materials for the anti-corrosion coating comprise for example parylene.

In one embodiment, the feeler may be arranged in a wall of a conduit via which air is supplied into or withdrawn from the test chamber. Then, the feeler may project into the conduit so far that the measurement element is located approximately in the center of the conduit and is engulfed by a flow of the air of which the moisture content is to be measured. A conduit section between the test chamber and the feeler may comprise a blocking member by which the conduit may be blocked. In this way, the feeler may temporarily be decoupled from the atmosphere in the test chamber, for example during testing operations in which a particularly corrosive salt mist is sprayed into the test chamber.

In another embodiment, the coating may be so robust that the feeler can be arranged directly at the wall of the test chamber, so that the printed circuit board is constantly exposed to the atmosphere in the test chamber.

BRIEF DESCRIPTION OF THE DRAWINGS

Embodiment examples will now be described in conjunction with the drawings, wherein:

FIG. 1 is a schematic view of a corrosion testing device according to the invention; and FIG. 2 is a sketch of a corrosion testing device according to another embodiment.

DETAILED DESCRIPTION

FIG. 1 schematically shows a part of a corrosion testing device comprising a test chamber 10 in which objects to be tested can be exposed to a controlled atmosphere for a specified period of time. The atmosphere is controlled in terms of temperature, chemical composition and, in particular, moisture content, such that corrosion of the objects to be tested is accelerated, so that the progress of corrosion can be detected and evaluated already after a limited period of time.

Attached to the test chamber 10 is a climate conditioning system 12 that contains a number of aggregates such as heaters, steam generators and the like, which have not been shown here and with which the air to be introduced into the test chamber 10 is conditioned. The drawing only shows a conduit 14 via which the conditioned air is introduced into the test chamber 10 by means of a blower.

A feeler 16 has been arranged in the wall of the conduit 14 such that it projects through the wall into the interior of the conduit 14. A feeler base 18 is located to one part inside and to another part outside of the conduit 14 and carries on its outer end, outside of the conduit 14, a connector box 20, and, at its inner end, a printed circuit board 22 which prolongs the feeler into the interior of the conduit 14. At its free end that is located approximately in the center of the conduit 14, the printed circuit board 22 carries a measurement element 24, e.g. a capacitive measurement element, for measuring the moisture content of the air flowing through the conduit 14. Optionally, the printed circuit board may also carry a temperature sensor or the measurement element 24 may be configured also for temperature measurements. The printed circuit board 22 further carries a number of electronic components 26 for controlling the measurement element 24 and for pre-processing of the measurement results. The printed circuit board is detachably held on the feeler base 18 and electrically connected to the connector box 20 via plug connectors 28, so that the measurement signal can be forwarded to a control device that has not been shown.

For protection against the corrosive impact of the humid air, the printed circuit board 22, including the electronic components 26 carried thereon, is provided with an anti-corrosion coating, e.g. a parylene coating on almost its entire surface, as has been symbolized by hatching in the drawing. Excluded from this coating are only the contacts of the plug-connectors 28 and, in the example shown, also a measurement surface of the measurement element 24. The electronic components 26 and the substrate of the printed circuit board 22 as well as the electric leads contacting the measurement element 24 are thus effectively protected against corrosion so that a long lifetime of the feeler 16 can be achieved in spite of the corrosive atmosphere. Only the measurement surface of the measurement element 24, e.g. an electrode, is exposed to the corrosive impact. In order to achieve a long lifetime, a particularly corrosion-resistant material may be used for this electrode, whereas the other leads and electrodes on the printed circuit board 22 may be made of cheaper materials.

When the end of the lifetime of the measurement element 24 is approaching, the feeler 16 may temporarily be disassembled so that the plug connection between the printed circuit board 22 and the feeler base 18 is released and the printed circuit board can be replaced by a new one. The non-coated contacts of the plug connectors 28 of the new printed circuit board may be impregnated with a substance that promotes the electric contact, such as silver conductive paste.

Optionally, the printed circuit board may be encapsulated in a detachable, air-permeable protective cap (not shown). The cap may for example be formed by a PTFE sinter filter with high chemical stability.

The part of the conduit 14 between the test chamber 10 and the portion containing the feeler 16 includes a blocking member 30 with which the part containing the feeler 16 may fluidly be disconnected from the interior of the test chamber 10. This offers the possibility to additionally protect the feeler 16 against corrosion when, during certain periods of the test process, the objects to be tested are exposed to a particularly corrosive atmosphere such as a mist of salt that has been sprayed into the test chamber 10 (via another conduit than the conduit 14).

In another embodiment, the printed circuit board 22 having the anti-corrosion coating may be configured to be so robust that it can withstand even the aggressive salt mist. In that case, the feeler 16 may also be mounted in the wall separating the test chamber 10 from the climate conditioning system 12, such that it projects directly into the test chamber, as has been shown in FIG. 2. In that case, the blocking member in the conduit 14 may be dispensed with.

The measurement surface of the measurement element 24 needs to be excluded from the anti-corrosion coating only when the measurement principle being employed requires that an electrode of the measurement element is directly exposed to the atmosphere to be measured. In case of another measurement principle, e.g. in case of a capacitive sensor that creates an electric field outside of the measurement element itself and can measure the dielectric constant of the surrounding air even through the coating, the measurement element 24 may completely be protected by the coating, as has been indicated by hatching in FIG. 2.

What is claimed is:

1. A corrosion testing device comprising:
    a test chamber,
    a climate conditioning system for maintaining a controlled atmosphere in the test chamber, and
    a measurement system comprising a feeler having a measurement element arranged on a printed circuit board for measuring the moisture content of the atmosphere,
    wherein the feeler includes a feeler base,
    wherein the printed circuit board is detachably held on the feeler base via plug connectors of the printed circuit board and is, with the exception of certain contact or measurement surfaces, fully encapsulated in an anti-corrosion coating.

2. The corrosion testing device according to claim 1, wherein the anti-corrosion coating is a parylene coating.

3. The corrosion testing device according to claim 1, wherein the anti-corrosion coating exposes a measurement surface of the measurement element.

4. The corrosion testing device according to claim 1, wherein the feeler is arranged in a wall of a conduit that is connectable to an interior of the test chamber.

5. The corrosion testing device according to claim 4, further comprising a blocking member for selectively blocking the conduit between the feeler and the test chamber.

6. The corrosion testing device according to claim 1, wherein the feeler is arranged in a wall of the test chamber and has its printed circuit board projecting into the interior of the test chamber.

7. A corrosion testing device comprising:
    a test chamber,
    a climate conditioning system for maintaining a controlled atmosphere in the test chamber, and
    a measurement system comprising a feeler having a measurement element arranged on a printed circuit board for measuring the moisture content of the atmosphere,
    wherein the feeler includes a feeler base,
    wherein the printed circuit board is detachably held on the feeler base via plug connectors of the printed circuit board and is fully encapsulated in an anti-corrosion coating.

8. The corrosion testing device according to claim 7, wherein the anti-corrosion coating is a parylene coating.

9. The corrosion testing device according to claim 7, wherein the measurement element is fully coated with the anti-corrosion coating.

10. The corrosion testing device according to claim 7, wherein the feeler is arranged in a wall of a conduit that is connectable to an interior of the test chamber.

11. The corrosion testing device according to claim 10, further comprising a blocking member for selectively blocking the conduit between the feeler and the test chamber.

12. The corrosion testing device according to claim 7, wherein the feeler is arranged in a wall of the test chamber and has its printed circuit board projecting into the interior of the test chamber.

* * * * *